(12) United States Patent
DiPlacido et al.

(10) Patent No.: US 6,246,690 B1
(45) Date of Patent: Jun. 12, 2001

(54) METHOD AND DEVICE FOR CONTROLLING DATA FLOW IN A COMPUTER DATA NETWORK

(75) Inventors: Bruno DiPlacido, Dedham; Lawrence A. Boxer, Carlisle, both of MA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/044,771

(22) Filed: Mar. 19, 1998

(51) Int. Cl.[7] .................................................. H04L 12/56
(52) U.S. Cl. ............................................ 370/408; 370/446
(58) Field of Search .................................. 370/412, 422, 370/423, 425, 426, 429, 229, 230, 445, 446, 447, 407, 408

(56) References Cited

U.S. PATENT DOCUMENTS

| | | | |
|---|---|---|---|
| 4,897,833 | * | 1/1990 | Kent et al. ............................ 370/447 |
| 4,941,143 | * | 7/1990 | Twitty et al. ........................ 370/445 |
| 5,805,589 | * | 9/1998 | Hochschild et al. ................. 370/389 |
| 5,822,300 | * | 10/1998 | Johnson et al. ...................... 370/229 |
| 5,936,962 | * | 8/1999 | Haddock et al. ..................... 370/446 |
| 5,936,964 | * | 8/1999 | Valko et al. .......................... 370/468 |
| 5,953,335 | * | 9/1999 | Erimli et al. ......................... 370/390 |
| 6,021,115 | * | 2/2000 | Simpson et al. ...................... 370/235 |
| 6,052,376 | * | 4/2000 | Wills .................................... 370/419 |
| 6,072,772 | * | 6/2000 | Charny et al. ........................ 370/229 |

\* cited by examiner

Primary Examiner—Chau Nguyen
Assistant Examiner—D. Trinh
(74) Attorney, Agent, or Firm—McGlew and Tuttle, P.C.

(57) ABSTRACT

An Ethernet flow control system, preferably for a Ethernet switch, having flow controlled transmitting ports in compliance with IEEE Standard 802.3x. The flow control system includes a shared resource, a plurality of buffers receiving data frames from the shared resource, and a plurality of transmitting ports. Each transmitting port being associated with one of the plurality of buffers and being flow controllable between an enabled state and a blocked state. The transmitting port removing and transmitting data frames from the associated buffer when in the enabled state. Each transmitting port including a timer for measuring the time that an associated buffer has a data frame and the corresponding transmitting port is in the blocked state. Each port also includes control logic for removing data frames from the associated buffer when the measured time is greater than a predetermined time.

14 Claims, 3 Drawing Sheets

METHOD AND DEVICE FOR CONTROLLING DATA FLOW IN A COMPUTER DATA NETWORK

FIELD OF THE INVENTION

The present invention relates to a flow controlled transmitting port according to Ethernet specifications in a computer network, and in particular to buffering data frames between a shared resource and a flow controlled transmitting port.

BACKGROUND OF THE INVENTION

The institute of electrical and electronic engineers (IEEE) has created a Ethernet specification 802.3X dated 1998. This specification standardizes a way in which transmitting and receiving ports communicate with each other. One of the requirements of this specification is that a receiving port can flow control a corresponding transmitting port between an enabled state and a blocking state. In a particular situation where a flow controllable transmitting port is located, a plurality of transmitting ports receives data from a shared resource. This shared resource sends data frames to the individual transmitting ports. Buffers are placed between the transmitting ports and the shared resource to buffer the movement of data frames from the shared resource to the corresponding data port. When a transmitting port is in the blocked state, the buffer can overflow and no longer accept data from the shared resource.

The buffers and shared resources in many situations are designed to transfer data so reliably, that if a specific buffer becomes full, and the shared resource has a data frame to transfer to that buffer, the shared resource will stop any further operation until the specific data frame can be transferred to the specific buffer. This is a very simple and reliable design, and already exists in many applications. The creation of receive ports which can flow control corresponding transmitting ports, is a new development and can cause existing buffers to quickly overflow and stop operation of the shared resource. This is disadvantageous because the remaining transmitting ports serviced by the shared resource may be able to transmit, and have data frames waiting in the shared resource for sending to corresponding transmitting ports. However, because a single transmitting port is in the block state, and its corresponding buffer overfilled, the shared resource is no longer operating. In this way a single transmitting port in the block state can prevent or disable all other ports associated with a shared resource to stop operation.

This is quite often the case in cross point switches of an Ethernet network. The shared resource is a FIFO with associated logic that sends data frames from the FIFO to corresponding buffers and transmitting ports. The creation of flow controllable transmitting ports, while beneficial in many ways, creates a problem in that the remaining transmitting ports of a shared resource can easily be rendered useless which reduces the operation of the network.

SUMMARY AND OBJECTS OF THE INVENTION

It is a primary object of the present invention to comply with IEEE standard 802.3X of 1998, and provide transmitting ports which are flow controllable, and which will not cause existing buffers and shared resources to stop operation when a transmitting port is in the block state for an extended period of time.

The present invention accomplishes this object by providing a transmitting port with a port control logic means that monitors the data movement between the buffer and the transmiting port.

When the buffer has data for transmission, it sends a valid data signal to the transmitting port. When the transmitting port receives the valid data signal, and is able to transmit a data frame, the transmitting port sends an "unload" signal to the data buffer. The data buffer then unloads the data to the transmitting port, and the transmitting port transmits the data to the corresponding receiving port.

A flow control timer means monitors the unload and valid data signals between the buffer and the transmitting port. When the flow control timer means reads a valid data signal, but no unload signal, the flow control timing means begins measuring time. When the measured time exceeds a predetermined value, the flow control timer means generates a "discard frames" signal to the port control logic. When the port control logic receives the discard frame signal, the port control logic removes data frames from the buffer.

The data frames can be removed from the buffer by either generating the unload signal, and instead of transmitting the data frame to the receive port, the frame is just discarded. This would then restart the flow control timer and restart the measuring of time.

As an alternative, the frames could be discarded by the port control logic without resetting the timer and the measuring of time. The port control logic is then provided with means to remove the data frames without generating the unload signal, or the flow control timer does not reset when the discard claims signal is present or the transmitting port is still blocked. In this latter case there is an additional signal from the port control logic to the flow control timer indicating whether the transmitting port is in the enabled state or the blocking state. When the port control logic indicates that the port is returned to the enabled state, the flow control timer then resets and removes the discard frames signal. The predetermined time value is different depending on whether or not the timer is reset after each unload, or only reset after the transmitting port returns to the enabled state.

In this way, the present invention is able to just replace the existing transmitting ports with a flow control port and keep the rest of the system operating without having other transmitting ports be disabled due to a block transmitter overflowing its corresponding buffer and stopping operation of the shared resource. At worst, a block port will only cease operation of a shared resource for the predetermined time, and then only if the corresponding buffer overfills. The remaining circuitry of the Ethernet system, and in particular the shared resource and buffers of the corresponding switch can remain the same and do not need to be completely redesigned to operate with a flow controlled port. This allows the new IEEE 802.3X specification to be implemented quickly and inexpensively. The design and test of a new chip is therefore minimized.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
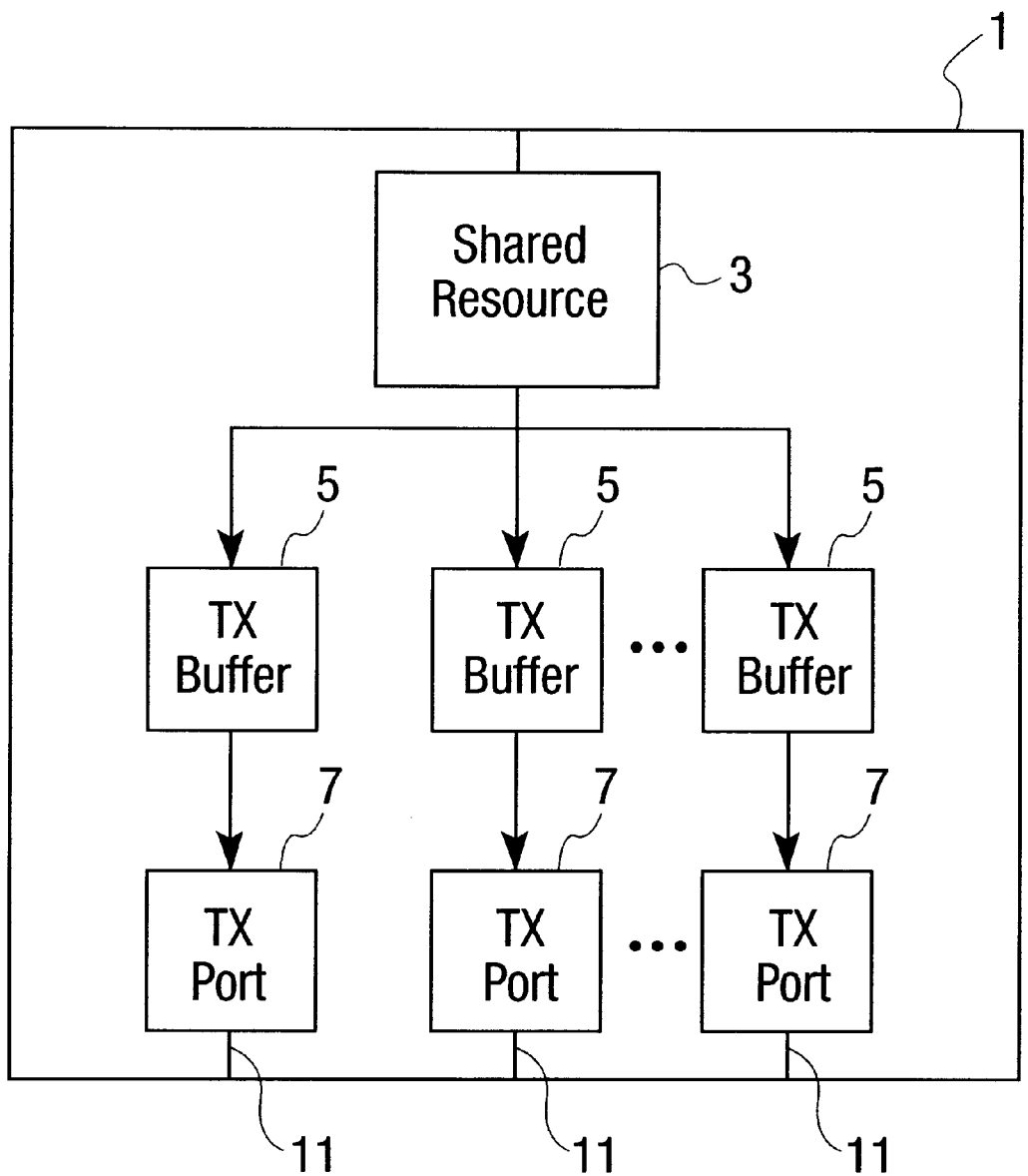
FIG. 1 is a schematic view of a integrated circuit having several transmitting ports associated with a single shared resource.
Figure 3:
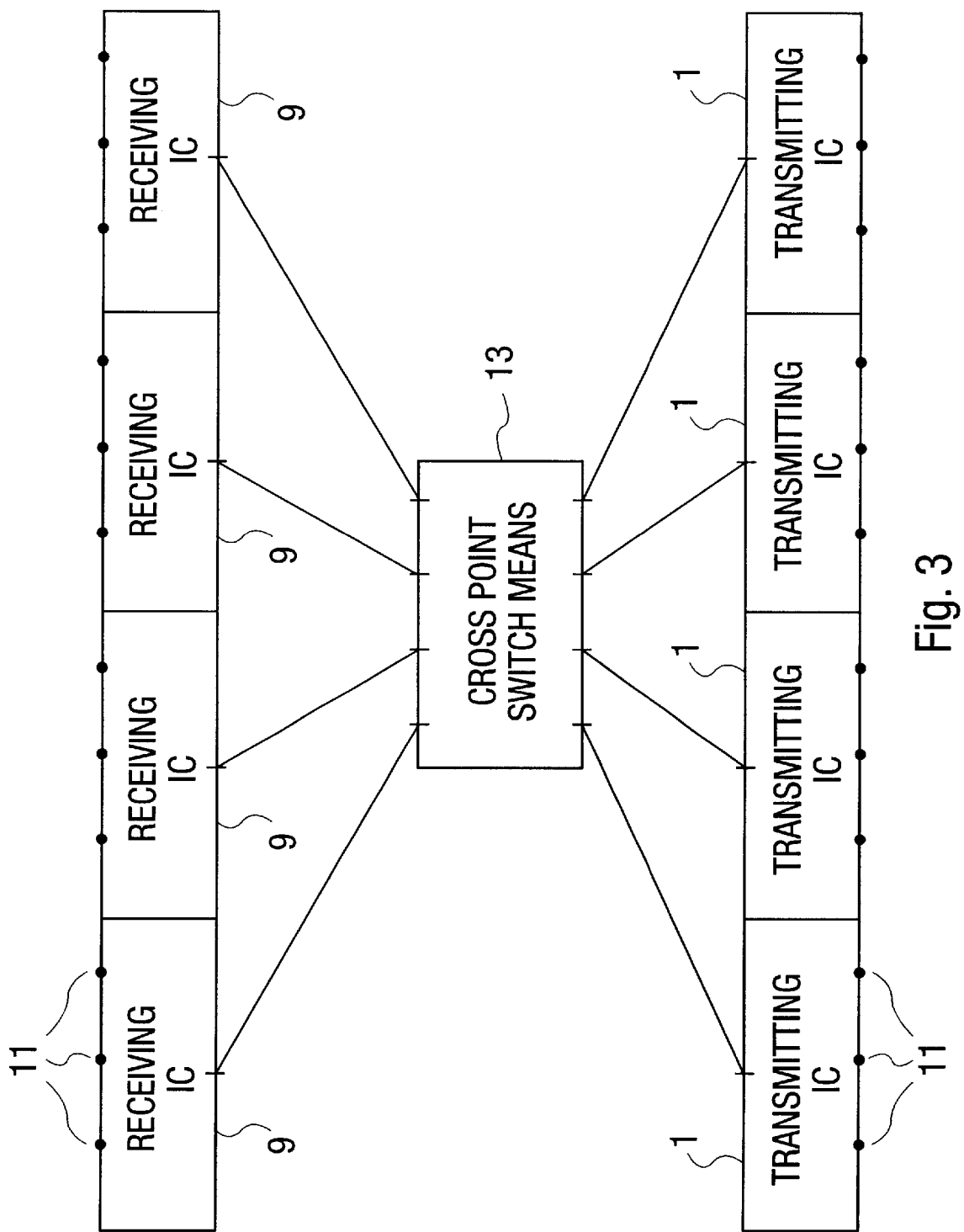
FIG. 3 is a schematic view of an Ethernet switch.

Referring to the drawings, and in particular to FIG. 1, reference numeral 1 represents an integrated circuit (IC) with a shared resource 3, buffers 5 and transmitting ports 7. The transmitting ports have port connectors 11. In the preferred embodiment the integrated circuit 1 is part of an Ethernet switch, as shown in FIG. 3, having a plurality of transmitting IC's 1 and receiving IC's 9. The transmitting and receiving IC's are connected to a crosspoint switch means 13. Data frames received by the receiving IC's 9, through their corresponding port connectors 11, are sent to the crosspoint switch 13. The crosspoint switch 13 then sends the data frame to the appropriate transmitting IC 1 where it is received by the shared resource 3. The shared resource 3 is preferably a FIFO with control logic to send the data frames to the appropriate transmitting port. Ethernet switches are well known in the art and no further explanation of them is required. The present invention is not limited to use in Ethernet switches, but instead can be used wherever a shared resource interacts with flow controlled transmitting ports.

The buffers 5 between the shared resource 3 and the transmitting ports 7 are used to compensate for possible out of synchronous movements of the data frame in the shared resource and the transmitting ports. The buffer and shared resource are preferably designed to insure that packets are not lost between the shared resource and the transmitting port. The buffer is appropriately sized for average or worst case mismatches in synchronous movements, and the shared resource will complete the sending of one data frame before sending the next data frame.

New IEEE standard 802.3x requires that transmitting ports 7 be flow controlled. This means that a receiving port can require that the corresponding transmitting port 7 stop sending data frames. The transmitting ports 7 are therefore switched between an enabled state where data frames are received from a buffer and transmitted, to a blocking state where no data frames are transmitted. With the buffers and shared resource being designed to reliably transfer packets, a significant backlog can occur where one blocked transmitting port can stop operation of a shared resource and possibly the switch means 13. It is also possible that due to this backlog and stopped operation, data frames can be lost further upstream for other transmitting ports which are in the enabled state.

Figure 2:
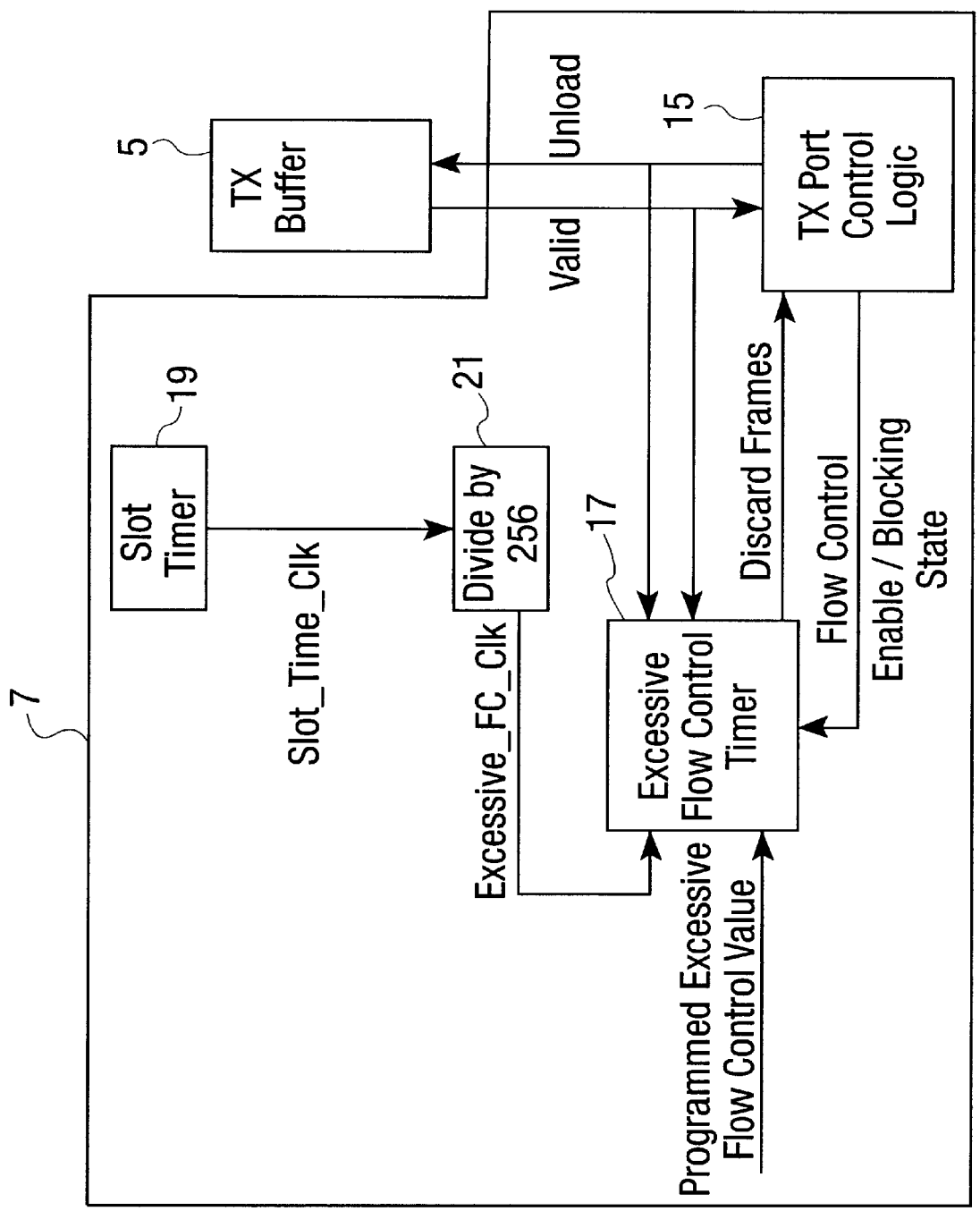
FIG. 2 is a flow chart showing the flow controllable transmitting port, and its interaction with the buffer.

As shown in FIG. 2, the flow controlled transmitting port has port control logic means 15 for transferring the data frames from the buffer to the transmitting port 7. When the buffer 5 has a data frame for transmission, a "Valid" signal is sent from the buffer to the logic means 15. When the port is enabled and ready to transmit data an "Unload" signal is sent to the buffer, and the data frame is transferred. When the port is blocked or otherwise not ready to transmit another data frame, the Unload signal is removed or absent.

In order to prevent buffers from overfilling, each flow controlled transmitting port also includes Excessive Flow Control Timer Means 17 for timing how long a data frame stays in the buffer when the port is blocked. The timer means 17 monitors the valid and unload signals, and starts measuring time when the valid signal is present and the Unload signal is not present. When the measured time is greater than a Programmed Excessive Flow Control or predetermined time value, the timer means 17 sends a Discard Frame signal to the logic means 15. The logic means then begins removing data frames from the buffer and discards the data frames. This can be done by the same unload signal and process used when the port is in the enable state, except that the data frame is not transmitted. This requires no change on the part of the buffer. Of course, other discarding devices and methods can be used.

As long as the measured time exceeds the predetermined time value, and the port is in the blocking state, the discard Frames signal is maintained and the logic means 15 continues to remove and discard data frames from the buffer. Once the port is switched to the enabled state, the timer is stopped, reset, and the Discard Frames signal removed. Operation of the buffer and transmitting port then continues with the transmitting port receiving and transmitting the data frames.

The present invention also counts the number of discarded data frames. When this number exceeds a maximum, an indication is provided to the Ethernet switch and corrective action is taken.

The timer means 17 operates by counting clock pulses or "Excessive_FC_Clk" signals from a slot timer 19. Since the slot timer 19 very often operates on a very high frequency, a divider 21 can be positioned between the slot timer 19 and the timer means 17. This divider preferably divides the signal from the slot timer by 256.

By using the flow controlled port 7 as described, transmitting IC's comply with the IEEE 802.3 standard, and shared resources and buffers can be used which simply and reliably transfer data frames from the shared resource to the buffer. The buffers are prevented from overflowing and stopping operation of the shared resource, at least for no more than the predetermined time value and then only if the buffer overflows. This prevents other ports from being disabled and prevents the loss of data frames for transmitting ports which are not blocked. The magnitude of the predetermined time value can be varied according to system parameters. One of the system parameters being the size of the buffer. If the buffer is large, the time value can be large without causes excessively long interruption of the shared resource. However the larger the buffer, the more expensive it is. Therefore the network operator is able to balance costs with the value of discarded frames and the effects of disabling other transmitting ports. The predetermined time value can be changed by the network operator if the value of discarded frames or overall network performance changes. The predetermined value can also change on a port by port basis.

The features described in specification, drawings, abstract, and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles.

What is claimed is:

1. A method for transferring data frames from a shared resource to a plurality of flow controlled transmitting ports, the method comprising:

providing a buffer associated with each of said transmitting ports;

transferring data frames from said shared resource to said buffers;

switching said each transmitting port between an enabled state and a blocked state depending on a status of a corresponding receiving port downstream of said each transmitting port;

measuring time for each of said transmitting ports from when said each transmitting port is in said blocked state and said associated buffer has a data frame;

discarding data frames from said associated buffer when said measured time exceeds a predetermined value.

2. A method in accordance with claim 1, wherein:

said shared resource sequentially completes a transfer of a data frame to one of said buffers before transferring another data frame.

3. A method in accordance with claim 2, wherein:

said discarding of data frames from said buffers is performed by said associated transmitting port;

said measuring of time is stopped and reset, and said discarding is stopped, when said associated port is switched to said enable state.

4. A method in accordance with claim 3, wherein:

said flow controllable transmitting ports comply with IEEE Standard 802.3x;

said shared resource, said buffers and said transmitting ports form a transmitting IC of an Ethernet network switch.

5. A method in accordance with claim 1, wherein:

said discarding of data frames from said buffers is performed by said associated transmitting port;

said measuring of time is stopped and reset, and said discarding is stopped, when said associated port is switched to said enable state.

6. A method in accordance with claim 1, wherein:

said flow controllable transmitting ports comply with IEEE Standard 802.3x.

7. A system in accordance with claim 1, wherein:

said shared resource, said buffers and said transmitting ports form a transmitting IC of an Ethernet network switch.

8. A system in accordance with claim 1, wherein:

said flow controllable transmitting ports comply with IEEE Standard 802.3x;

said shared resource, said buffers and said transmitting ports form a transmitting IC of an Ethernet network switch.

9. An Ethernet flow control system comprising:

a shared resource;

a plurality of buffers receiving data frames from said shared resource;

a plurality of transmitting ports, each said transmitting port being associated with one of said plurality of buffers, said each transmitting port being flow controllable between an enabled state and a blocked state, said each transmitting port removing and transmitting data frames from said associated buffer when in said enabled state, said each port including timer means for measuring time when said associated buffer has a data frame and said corresponding port is in said blocked state, said each port also including control logic means for removing data frames from said associated buffer when said measured time is greater than a predetermined time.

10. A system in accordance with claim 8, wherein:

said timer means generates a Discard Frames signal when said measured time is greater than said predetermined time, said control logic means removes data frames from said associated buffer without transmitting said data frames when said Discard Frame signal is present, said timer means removes said Discard Frame signal and resets said timer means when said corresponding transmitting port is switched to said enable state.

11. A system in accordance with claim 9, wherein:

said shared resource completes a transfer of a data frame to one of said buffers before transferring another data frame, each of said buffers not accepting additional data frames after said each buffer is full.

12. A system in accordance with claim 9, wherein:

said shared resource sequentially completes a transfer of a data frame to one of said buffers before transferring another data frame, each of said buffers not accepting additional data frames after said each buffer is full.

13. A system in accordance with claim 8, wherein:

said flow controllable transmitting ports comply with IEEE Standard 802.3x.

14. A system in accordance with claim 8, wherein:

said shared resource, said buffers and said transmitting ports form a transmitting IC of an Ethernet network switch.

\* \* \* \* \*